United States Patent
Tzeng

(10) Patent No.: US 8,560,761 B2
(45) Date of Patent: Oct. 15, 2013

(54) MEMORY RESOURCE MANAGEMENT FOR A FLASH AWARE KERNEL

(75) Inventor: Tzungren Allan Tzeng, San Jose, CA (US)

(73) Assignee: Spansion LLC, Sunnyvale, CA (US)

( * ) Notice: Subject to any disclaimer, the term of this patent is extended or adjusted under 35 U.S.C. 154(b) by 795 days.

(21) Appl. No.: 12/059,795

(22) Filed: Mar. 31, 2008

(65) Prior Publication Data
US 2009/0248957 A1    Oct. 1, 2009

(51) Int. Cl.
*G06F 13/00* (2006.01)
(52) U.S. Cl.
USPC .... 711/103; 711/117; 711/157; 711/E12.002; 710/52

(58) Field of Classification Search
USPC ............ 711/103, 117, 157, E12.002; 710/52
See application file for complete search history.

(56) References Cited

U.S. PATENT DOCUMENTS

| | | | |
|---|---|---|---|
| 5,454,093 A * | 9/1995 | Abdulhafiz et al. | 711/133 |
| 2004/0083335 A1 * | 4/2004 | Gonzalez et al. | 711/103 |
| 2008/0109592 A1 * | 5/2008 | Karamcheti et al. | 711/103 |

\* cited by examiner

*Primary Examiner* — Edward Dudek, Jr.
(74) *Attorney, Agent, or Firm* — Turocy & Watson, LLP

(57) ABSTRACT

A memory system is provided. The system includes an operating system kernel that regulates read and write access to one or more FLASH memory devices that are employed for random access memory applications. A buffer component operates in conjunction with the kernel to regulate read and write access to the one or more FLASH devices.

20 Claims, 12 Drawing Sheets

MEMORY RESOURCE MANAGEMENT FOR A FLASH AWARE KERNEL

TECHNICAL FIELD

The subject innovation relates generally to memory systems and in particular to systems and methods that employ FLASH memory technology in lieu of conventional DRAM memory subsystems.

BACKGROUND

A wide variety of memory devices can be used to maintain and store data and instructions for various computers and similar systems. In particular, FLASH memory is a type of electronic memory media that can be rewritten and that can retain content without consumption of power. Unlike dynamic random access memory (DRAM) devices and static random memory (SRAM) devices in which a single byte can be erased, FLASH memory devices are typically erased in fixed multi-bit blocks or sectors. FLASH memory technology can include NOR FLASH memory and/or NAND FLASH memory, for example. FLASH memory devices typically are less expensive and denser as compared to many other memory devices, meaning that FLASH memory devices can store more data per unit area.

FLASH memory has become popular, at least in part, because it combines the advantages of the high density and low cost of EPROM with the electrical erasability of EEPROM. FLASH memory is nonvolatile; it can be rewritten and can hold its content without power. It can be used in many portable electronic products, such as cell phones, portable computers, voice recorders, thumbnail drives and the like, as well as in many larger electronic systems, such as cars, planes, industrial control systems, etc. The fact that FLASH memory can be rewritten, as well as its retention of data without a power source, small size, and light weight, have all combined to make FLASH memory devices useful and popular means for transporting and maintaining data.

Typically, when data is stored in a physical location (e.g., physical block address (PBA)) in a memory device, a system block address (LBA) can be associated with the data to facilitate retrieval of the data from the memory by a host. An address translation table can be used to store the translations of LBAs to the PBAs. When the host requests data from or desires to write data to a particular LBA, the address translation table can be accessed to determine the PBA that is associated with the LBA. The LBA associated with the data can remain the same even if the PBA where the data is stored changes. For example, a block of memory containing the PBA can have antiquated data in other memory locations in the block. The block of memory can be erased to reclaim the block, and valid data stored in the block, including the data in the PBA, can be moved to new physical locations in the memory. While the PBA of the data is changed, the LBA can remain the same. The address translation table can be updated to associate the new PBA with the LBA.

In conventional computing systems, DRAM technology has typically been employed to operate the dynamic memory of the computer in order for an application to operate at high speeds. Slower speed memories such as hard drives and FLASH technology have been utilized for non-volatile long term storage requirements. As previously noted, FLASH provides lower power consumption with higher density capability per package size than DRAM. It would be desirable if some of the advantages of FLASH technology could be exploited to support many of the applications that are currently running with DRAM technology. Unfortunately, there currently are bandwidth issues with FLASH that would not allow for a direct substitution with existing DRAM applications.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

Operating system kernel enhancements are provided to enable FLASH memory technologies to be utilized for existing DRAM applications in computer memory subsystems. In one aspect, basic components of a memory management system are analyzed and modified to enable recognition of a FLASH architecture as the main memory component of the system yet also process memory operations in view of a DRAM memory that allows the system to account for timing/programming nuances of FLASH operations. Such nuances include longer write times to FLASH memory than conventional DRAM memory as well as defined paging requirements where entire segments of FLASH are updated as opposed to a single byte or word of memory as in conventional DRAM systems.

In order to account for FLASH characteristics and the segmented nature of main memory between FLASH space and DRAM space, various components are provided to manage access to the respective spaces. In one aspect, when data is fetched from main memory, a determination is made as to whether or not read or write access is detected. Such determination can be triggered off of a page fault mechanism (or other event) associated with the kernel. If a read is attempted, FLASH can be allocated for the read yet marked to indicate that a previous allocation has occurred. If a write is later detected, a DRAM page can be allocated to account for temporary latencies of writing to FLASH and to allow a de-mapping of the FLASH. A follow-on copy instruction or other function can be employed to synchronize what has been written to DRAM and the previously allocated FLASH memory. In this manner, FLASH can be updated during background operations while mitigating program delays associated with latency or other sector management.

In yet another aspect, a page buffer can be sized to account for buffering at least one page of FLASH memory during page-in operations from permanent storage devices. Typically, the amount buffered will allow program operations to continue normally while the FLASH is updated during background operations. For higher throughput applications where memory may be accessed at a higher rate, the buffer can be sized for greater capacity to allow program operations to continue and not be stalled by respective writes to the FLASH. In still yet another aspect, additional memory lists can be created, where one of the lists facilitates mapping and de-mapping of FLASH memory and the other lists facilitates mapping and de-mapping of the associated DRAM memory. It is noted that FLASH and DRAM memory management can occur via hardware components such as an application integrated circuit, via software components such as the kernel modifications described herein, and can also occur as a combination of hardware and/or software solutions.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Systems and/or methods are presented that facilitate usage of FLASH memory technologies in place of conventional DRAM subsystems. In one aspect, a memory system is provided. The system includes an operating system kernel that regulates read and write access to one or more FLASH memory devices that are employed for random access memory applications. A buffer component operates in conjunction with the kernel to regulate read and write access to the one or more FLASH devices. Various components are provided with the kernel to support a FLASH main memory, where DRAM is employed to account for programming nuances of the FLASH.

Figure 1:
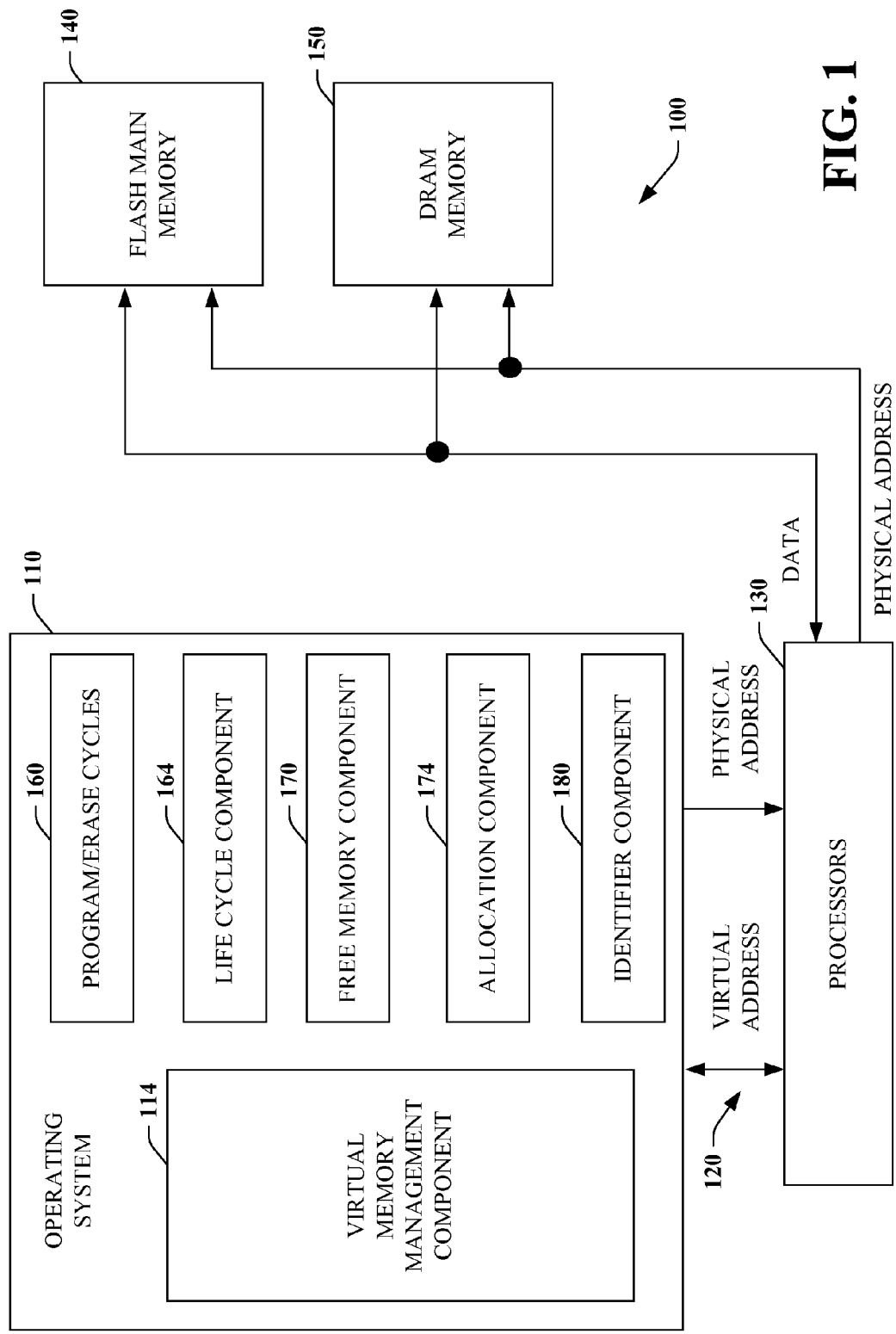
FIG. 1 illustrates a block diagram of a FLASH memory kernel architecture employed for random access memory applications.

Referring initially to FIG. 1, a system 100 illustrates a FLASH memory kernel architecture employed for random access memory applications. The system 100 includes an operating system 110 with various components of a kernel such as a virtual memory management component 114 (also referred to as VMM 114) that controls how program memory is utilized by one or more programs executing in accordance with the operating system. As shown, the operating system 110 and VMM 114 generate virtual and physical addresses 120 that are employed by one or more processors 130 to read data with a FLASH memory 140 and read/write data with a DRAM memory 150. In general, the DRAM memory is provided to accommodate the random write access requests from the associated system processes. Flash has certain limitations which include slower write times for data to the FLASH 140 and latency associated with having to update entire sectors of the FLASH 140 instead of individual addresses as in conventional systems that employ DRAM entirely for main memory. Thus, various components are added to the operating system 110 and associated kernel to map virtual addresses and physical addresses 120 in view of the segmented memory architecture shown where the FLASH memory 140 is employed as the main memory and the DRAM memory 150 is employed to receive the random write traffic from the processors 130, as will be described in more detail below.

In general, the system 100 provides an operating system 110 that allows both DRAM 150 and FLASH memory 140 devices in the physical main memory pool and can manage the combined memory pool as memory pages without having to navigate through a file system layer. In order to create an operating system 110 capable of accommodating both DRAM 150 and FLASH memory 140 as the physical main memory there are various components that are provided that facilitate Kernel execution remains as efficient as it was in a full DRAM system. Thus, the Virtual Memory Management 114 sub-system is modified for the respective FLASH memory 140 characteristics and can manage the combined page resources suitably. Other components of the operating system 110 can include:

a. A component 160 that keeps track of program/erase cycles of device groups in which program/erase cycles are still under way.

b. A component 164 that can process DRAM pages and the FLASH pages through their respective life cycles.

c. A component 170 which can free up both DRAM and FLASH pages when available memory of either type is low.

d. A component 174 which allocates the appropriate type of pages based on:
   i. access types, Read or Write;
   ii. which type of page faults, major, minor of protection;
   iii. Whether or not it hits an existing mapped page.

Other aspects include providing a component 180 which can identify and distinguish between a DRAM DIMM (dual inline memory module) and a FLASH DIMM to determine the total capacity of both types of memories during system boot-up. One type of DIMM resides on a DDR memory channel that can buffer a few pages of data and provide instant data forwarding after the data is written into the buffer 150. Also, the allocation component 174 can seamlessly allocate a DRAM page for a Write reference that hits on a FLASH page. Before proceeding, a few of the following terms are described:

Kernel: Center Piece of an Operating System 110.

Process: An executable form of a program.

Virtual Memory Management Sub-system (VM): Presents a simple memory programming model to applications and provides a programming model with a larger memory size than that of available physical main memory to enable use of slower but larger secondary storage.

Figure 2:
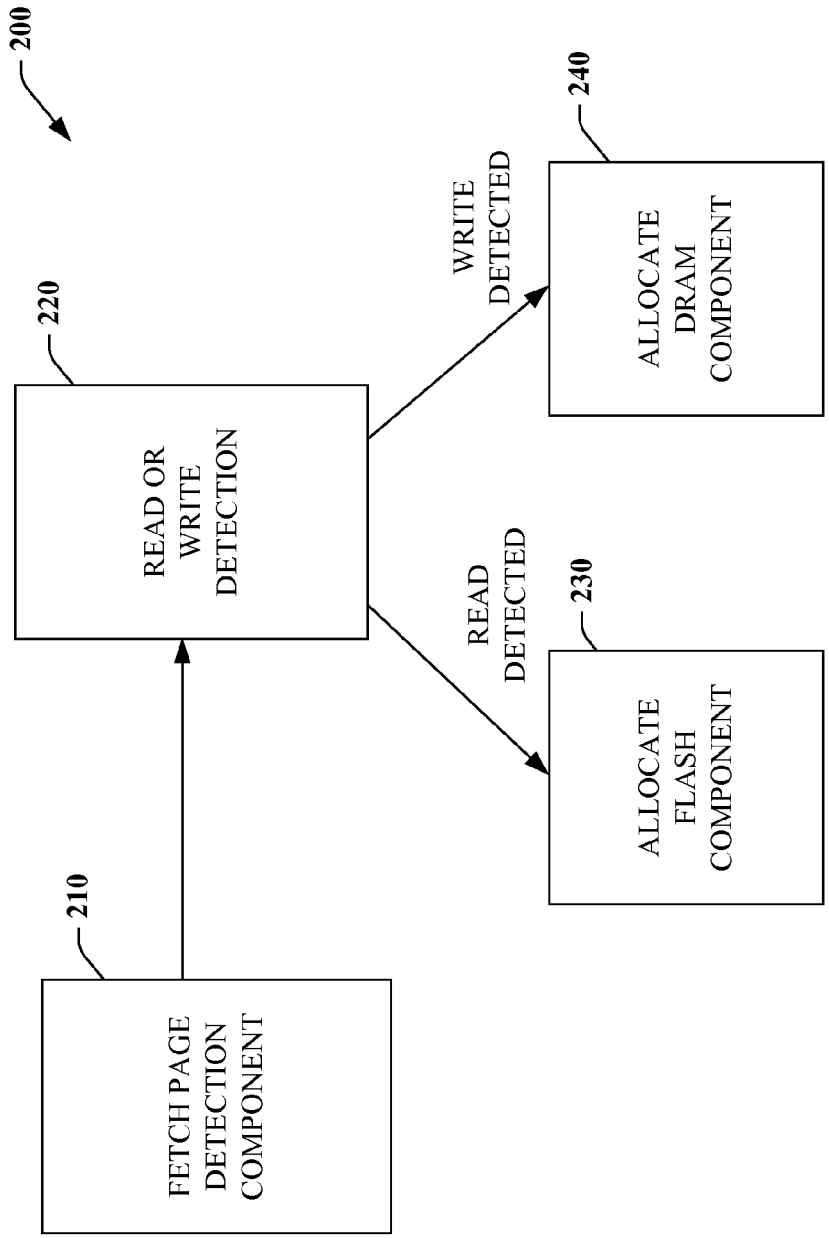
FIG. 2 depicts a block diagram of a FLASH and DRAM allocation system.
Figure 3:
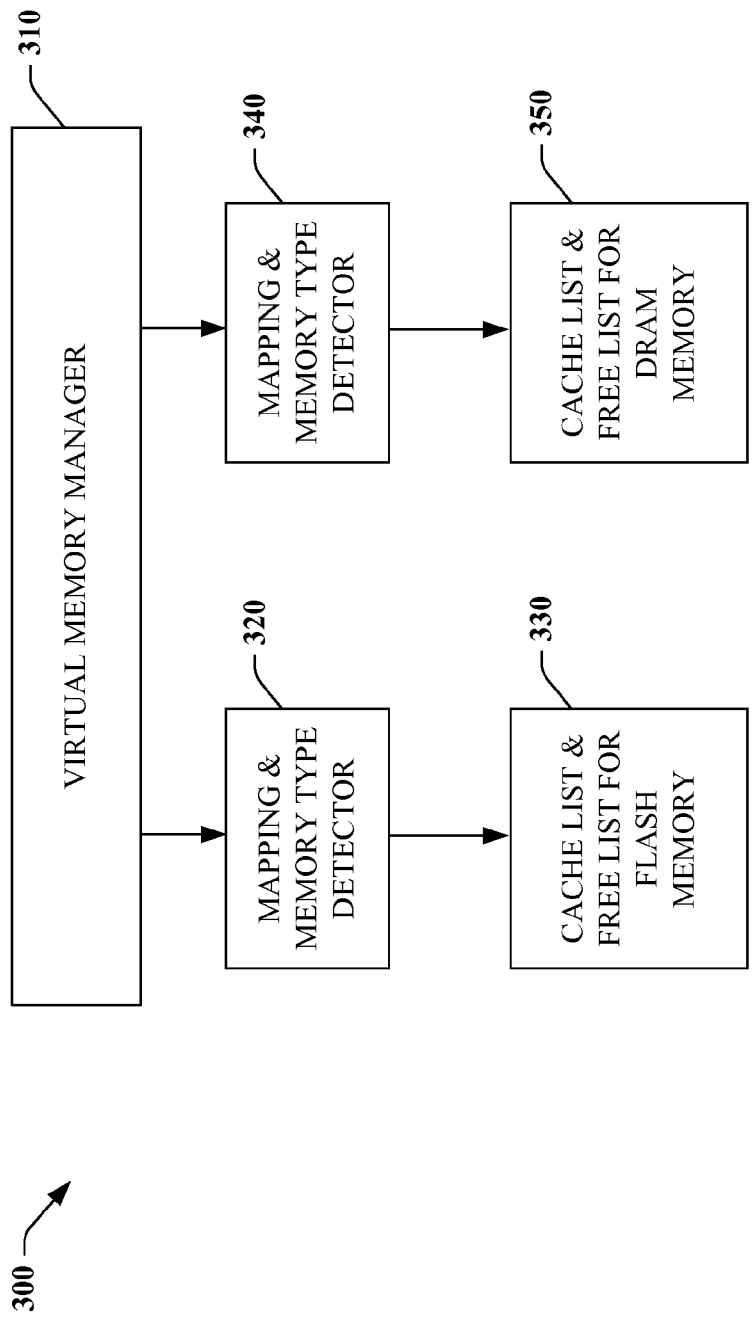
FIG. 3 illustrates a block diagram of a system that employs alternative lists to manage mapping operations between FLASH and DRAM.
Figure 4:
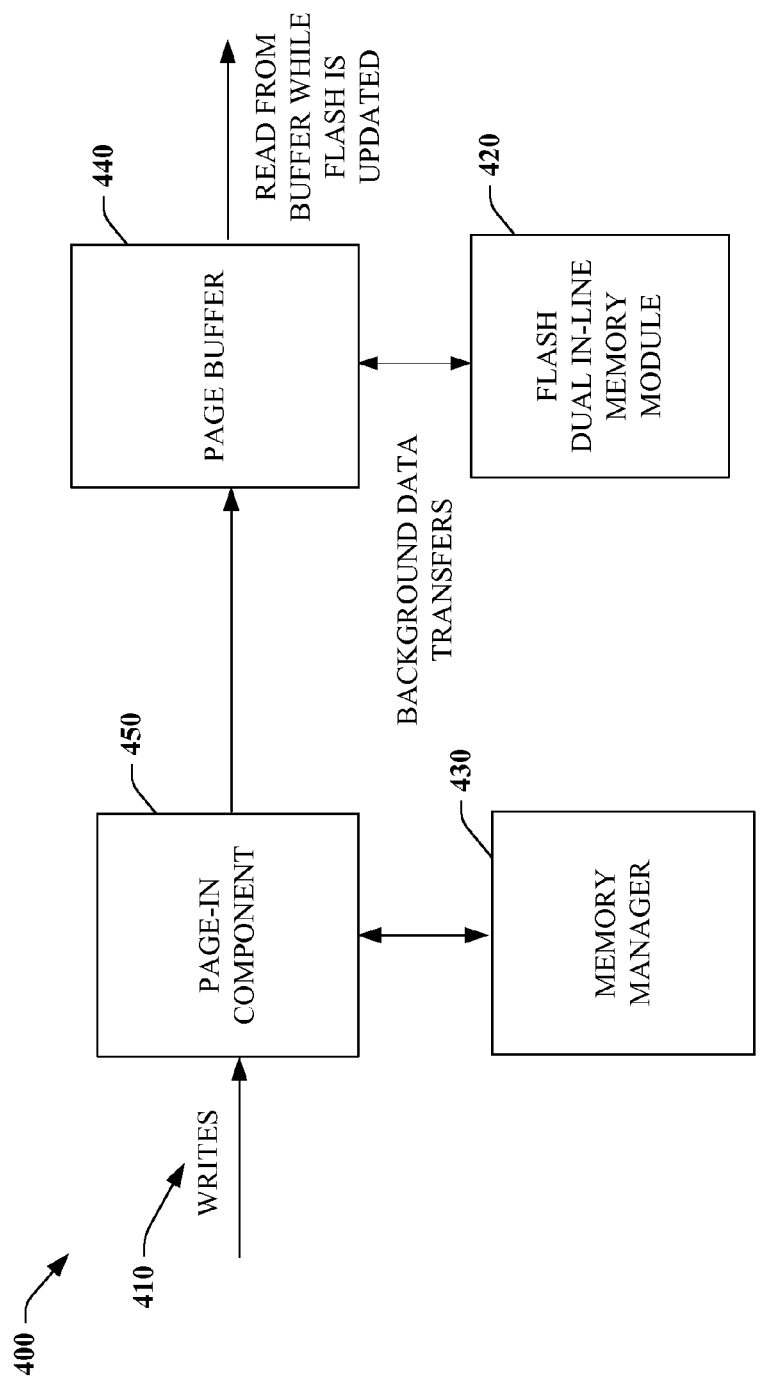
FIG. 4 is a block diagram depicting a kernel architecture adapted for a Flash DIMM which has a page buffer made of DRAM or SRAM.
Figure 6:
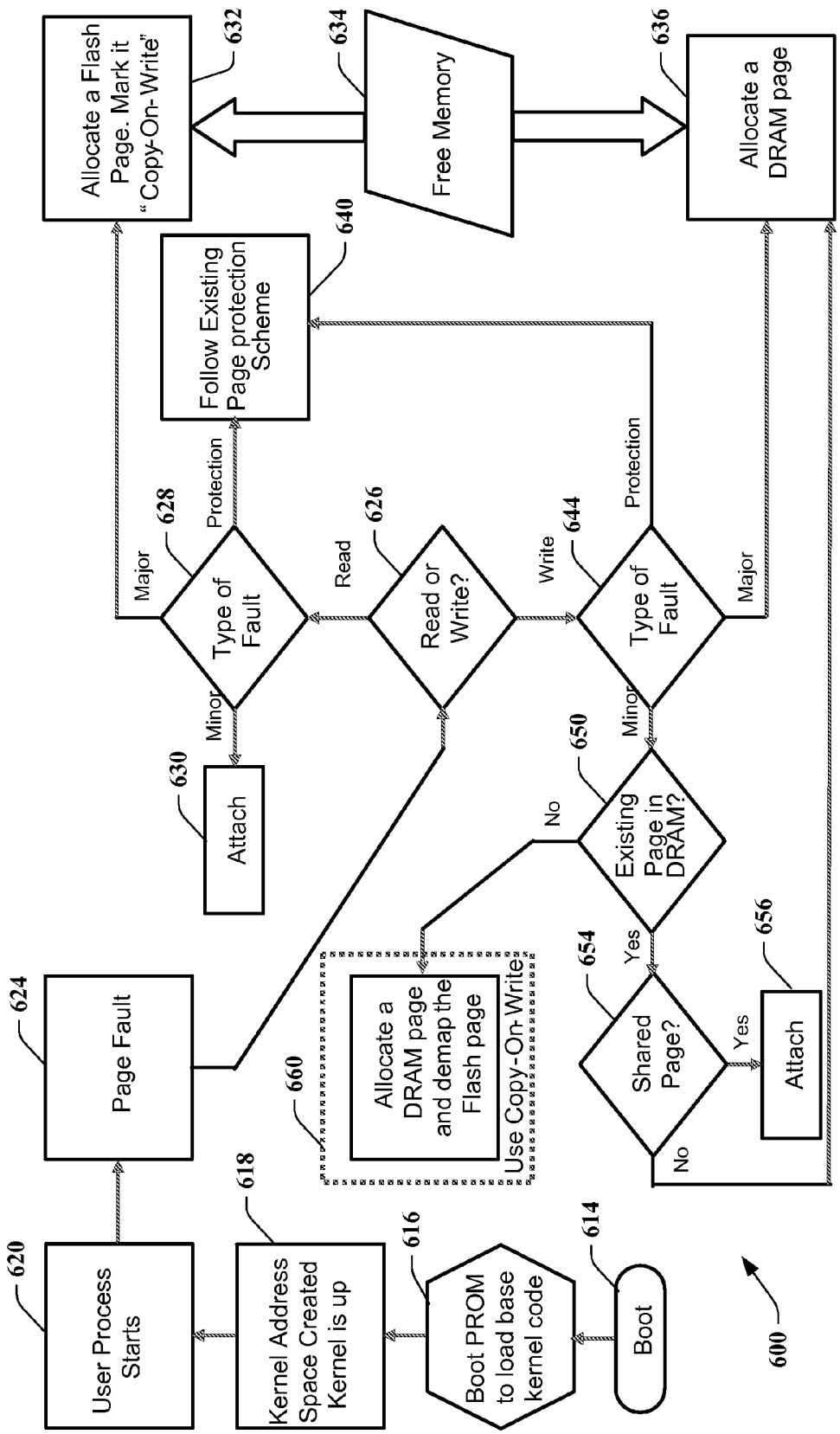
Figure 7:
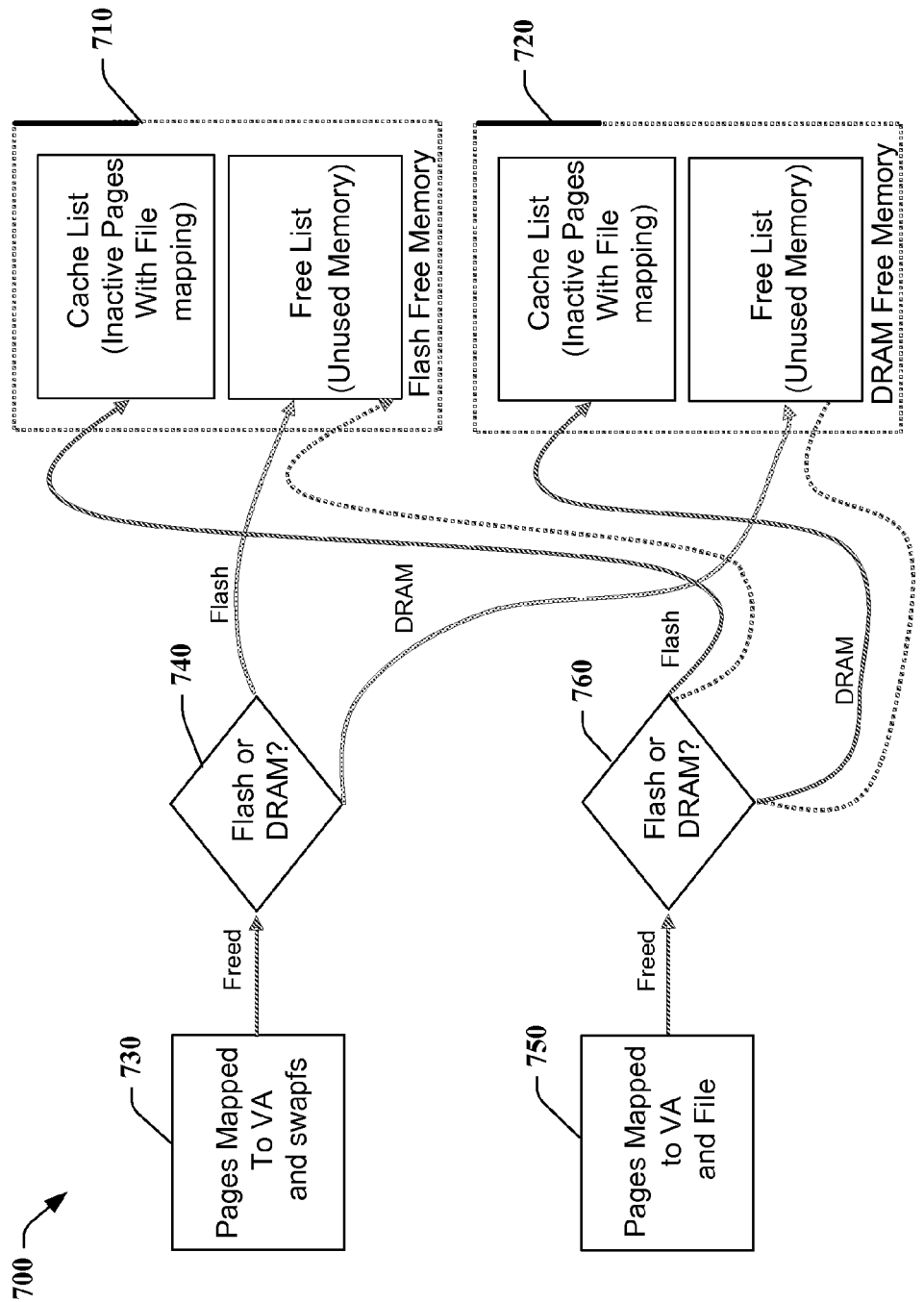

Address Space of a Process: Is the range of memory addresses that are presented to the process as its environment; as a process progresses, some addresses are mapped to physical memory, whereas some are not. FIGS. 2-4 will now described systems and components that support the dual memory type architecture depicted in FIG. 1 whereas FIGS. 5-7 depict associated methods.

Referring now to FIG. 2, a FLASH and DRAM allocation system 200 is illustrated. In general and as noted previously, FLASH memory has a limitation with regard to accepting content updates, both in bandwidth and in granularity when compared to a DRAM device. The systems described below with respect to FIGS. 8-11 employ DRAM devices as buffer to help mitigate the Writes and employ an ASIC to manage the DRAM as well as the FLASH devices. The system 200 provides an operating system change which utilize existing mechanisms, plus minimal new routines to manage a hybrid DRAM and FLASH memory subsystem without needing a controller ASIC. As shown, the system 200 includes a fetch page detection component 210 that determines when a page is fetched from permanent storage. This invokes read or write detection operations at 220. If a page read is detected, FLASH memory is allocated and subsequently marked or tagged as allocated at 230. If a write is detected, DRAM is updated at 240. A subsequent function could be called to transfer contents from the DRAM to the FLASH in a background operation of the operating system. More detailed methodologies that are employed by the system 200 are illustrated and described with respect to FIGS. 5 and 6 below.

When an operating system initiates a process, a range of virtual address is assigned to the process. A page table is also built. Read and Write access will then refer to the table. If an entry is valid, proper physical address (PA) is obtained and access to main memory is made. If an entry is not valid, a page fault trap occurred and an operating system page handler routine is invoked which moves the page from disk to the main memory at 210. When the main memory is full and a new page from disk needs to be brought in, a page is selected based on replacement algorithms and pushed back to the disk if dirty (modified during its tenure in the main memory). This activity is referred to as swapping. When a process is run and its working set changes, the process swaps pages between memory and disk during the run when necessary. However, the indication of demands of the pages comes from both Read and Write accesses. In a hybrid DRAM/FLASH system described herein, where both DRAM DIMMs and FLASH DIMMs exist, the Writes are directed to the DRAM at 240 and Read from DRAM and FLASH.

Figure 5:
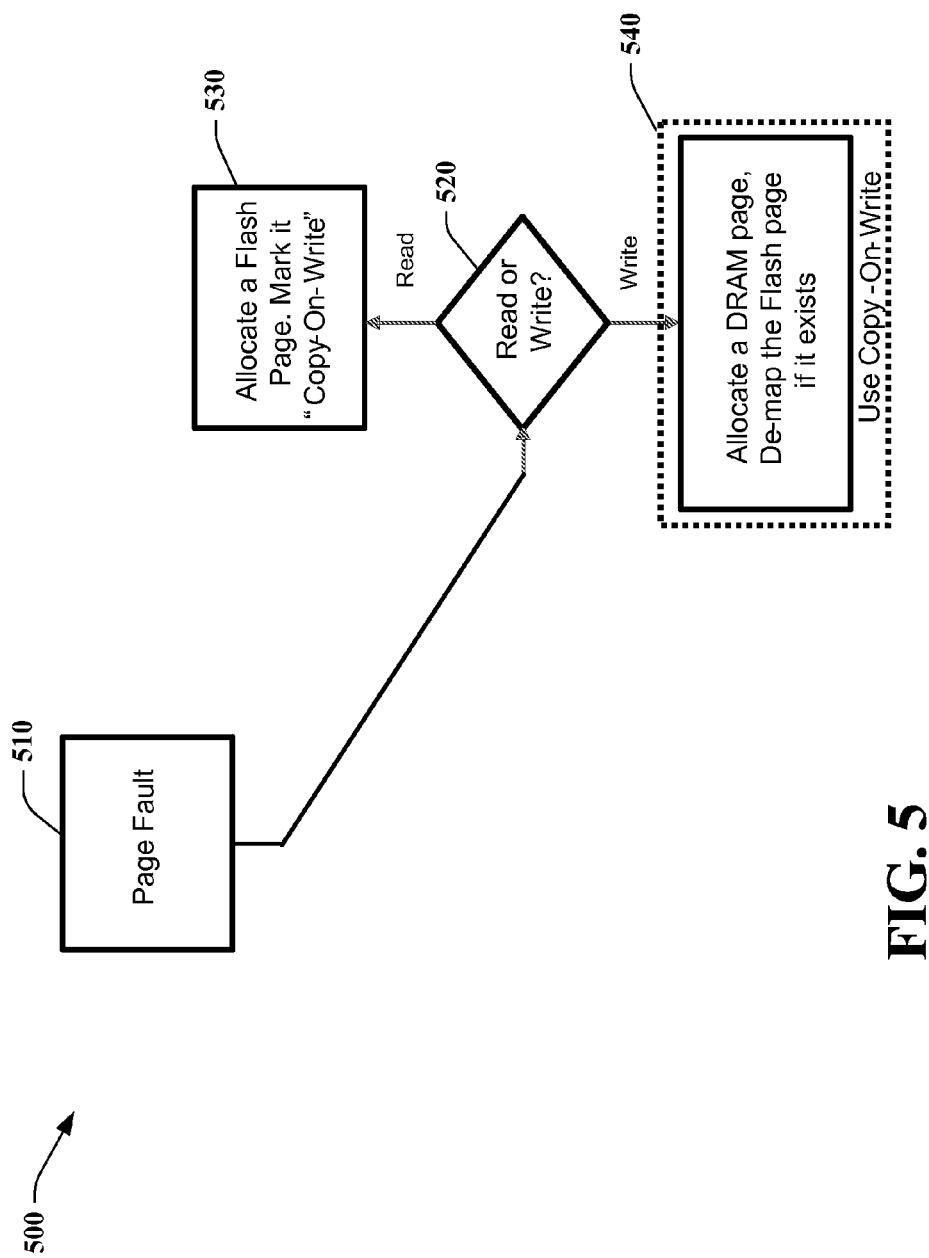
FIGS. 5-7 illustrate example virtual memory management methodologies for managing memory subsystems that employ DRAM and FLASH devices.

In one specific example, a fork ( ) Linux routine which initiates a child process into a "copy-on-write" mode could be employed and is described in more detail in FIG. 5. In the fork ( ) using "copy-on-write", the child process has a new virtual address (VA) and a new page table. However, the new page table has entries pointing to all physical pages the parent process points to. Thus, the entries are marked "copy-on-write" protection. Upon a write access demand on a page, the "copy-on-write" protection flag will have the page fault handler fetch a new physical page to process the write.

Upon system start up, a process will use page fault (or other mechanism at 210) to bring in the pages from the disk. When that process is complete, the fork ( ) is employed and relies on the child process to take all future Writes. Thus, new pages allocated by the page fault handler due to the copy-on-write will bring in pages only from the DRAM. Thus, the copy-on-write action can copy the page content from the Flash page to DRAM page without having to fetch the data from the disk. The DRAM will now hold the "write working set" and the operating system should swap pages into disk (or potentially to FLASH) when necessary, similar to the typical "swapping" activity but only for the write pages and only for the DRAM pages. For the read access triggered swapping, the operating system should perform the swapping similar to the traditional swapping but only for the read and only for the FLASH.

When bringing data from the disk during page fault handling, the operating system can employ DMA (direct memory access controller) which is FLASH aware, i.e., understands the FLASH's program and erase mechanisms. An erase command is sent to the FLASH and then data chunks which corresponds to the maximum data chunk a FLASH can allow is used as the DMA size. Multiples of this type of DMA could be used to bring in a page from disk to the FLASH. Among these DMA's, proper wait time is inserted by the operating system to ensure FLASH Memory program latency is satisfied. As noted above, more detailed flow diagrams are provided in FIGS. 5 and 6. Alternatively, the Flash DIMM can be made such that the DIMM-internal logic can process the Flash devices' program and erase cycles, taking data and addresses from the DIMM built-in page buffers. In this manner, the DMA routine can be utilized as if it were operating with DRAM DIMMs.

Referring to FIG. 3, a system that employs alternative lists to manage mapping operations between FLASH and DRAM. In general, when a single type of memory is employed, a single cache list and free list can be employed to manage program memory requirements. The system 300 depicts a dual-natured system where a virtual memory manager 310 provides a mapping and memory type detector 320 and a cache and free list 330 for a FLASH memory type. In addition, a separate path is maintained mapping and memory type detector 340 and a cache and free list 350 for an associated DRAM memory type.

In general, state of the art operating systems currently used by laptop, desktop and server computers manage main memory resource through a sub-system called "Virtual Memory Management." This subsystem assumes main memory to consist of only DRAM type of devices which can handle DRAM type of access patterns. With the advance of FLASH memory and its low power and non-volatility characteristics, there is a great benefit to add FLASH Memory devices to the main memory resource pool. Unfortunately, existing operating systems do not have a provision to work with FLASH memory without a file system and can not process the characteristics of the FLASH Memory devices occupying in the main memory resource pool. The system 200 provides a resource management scheme in the Virtual Memory Management subsystem which provides an operating system the ability to manage DRAM and FLASH resources separately. In addition to the other systems described herein, this enables the adoption of FLASH memory devices into the desktop and server computer systems' main memory pool.

Generally, various approaches can achieve the dual memory type management. One approach is to have separate cache list and free list for the FLASH Memory pool at 330, besides having the existing cache list and free list for the DRAM pool at 350. Joint lists can work as well by adding identification for each element (page) of the link list such that a page allocation function can choose either DRAM or FLASH memory pages as it attempts to locate an available page from the main memory pool during handling of a page fault. With respect to the approach of having a separate cache list and free list for the FLASH Memory, besides the existing pair for the DRAM. Various components are described below:

(1) Pages in the DRAM pool and pages in the FLASH Memory pool will go through their own page life cycle.

(2) Page scanner scans all pages but frees the pages to their respective lists. The flush daemon part of the page scanner will scan only the DRAM related list since the FLASH related list won't be "dirty." Page scanner is triggered during either DRAM shortage or FLASH shortage.

(3) Three types of page faults: Major, Minor, protection;

a. Major page fault, Read page fault should trigger a page-in from the main storage (in most cases disks) to the FLASH Memory. All pages paged-in in this manner can be marked "copy-on-write" protection (see FIG. 2 description above). Write page fault should trigger a page-in from the main storage to the DRAM.

b. Minor page fault, if the existing physical page is a DRAM page the minor page fault should trigger a regular "Attach" where the faulting process will establish a mapping to the existing physical page, regardless of Read or Write page faults. If the existing physical page is a FLASH page, the Read minor page fault should trigger a regular "Attach" where the faulting process will establish a mapping to the existing physical page. If it is a Write minor page fault, it should be handled as a protection page fault.

c. Protection page fault: Other than or in addition to usual protection page fault. When a write miss triggers a "copy-on-write" protection page fault on a FLASH page, a new DRAM page is allocated for the write and existing FLASH physical page is de-mapped.

(4) As a configurable option: Normally de-mapped DRAM page can stay in the cache list and eventually free list. If a Write page fault hits the same (vnode, offset) the page can be mapped again. While it is still in the cache list, an option is to allocate the DRAM page directly upon a Read page fault hitting the (vnode, offset). Another option is to move pages as a background daemon from the DRAM cache list to the FLASH cache list in anticipation of future Read page faults. It is noted that vnode is a virtual node describing the beginning of a file location and offset is an index into the respective file. The vnode and offset thus are specified in a pair and employed to map or de-map physical and virtual addresses within the confines for main memory which includes FLASH and a DRAM buffer.

(5) It is noted that care should be taken when paging-in from the main storage (most often a disk) to the FLASH main memory pool due to the long Program/Erase cycle. A FLASH DIMM with page buffer and data forwarding capability (described in FIG. 4) can be used to facilitate efficient DMA activities and provides immediately available page data for the "de-waitlisted" processes right after DMA completion. However, even with the FLASH DIMM, the kernel may need to be aware of the pending Program/Erase cycles within the DIMM and FLASH devices to avoid overrunning the page buffer within the DIMM. Utilizing the address interleaving controls within the memory controller and/or using mechanisms built-in within the DIMM can help to spread out sequential pages' page-in activities into multiple device groups instead of concentrating on a single device group and having to handle the page-in serially. A more detailed flow diagram is provided in FIG. 6 that illustrates some of the concepts described with respect to the system 300.

Referring to FIG. 4, a system 400 illustrates page buffer considerations. The system 400 includes a page-in component 450 that processes memory writes 410 that are temporarily stored in a page buffer 440. A memory manager 430 guides data into the page buffer 440 and also is responsible for transferring buffer contents to FLASH 420 in full hardware background operations within the DIMM. During background transfers, data can be read from the page buffer 440 by the processes to mitigate program delay.

Conventional FLASH memory with DDR (dynamic data ram) resolves electrical and protocol difference between the DDR and a typical FLASH memory. It enables FLASH memory devices or DIMM to sit on a DDR channel (bus). However, such memory does not change the inherent write bandwidth and latency limitation of a FLASH memory device. Therefore, a FLASH memory with DDR interface continues to be hard to use. The system 400 assumes an operating system which is aware of the existence of FLASH memory devices in the main memory pool. It provides an efficient way for the operating system to transition from page-in activity where all processes that use this page are wait-listed to allowing all processes that were wait-listed to proceed without explicit wait counter within the DMA device driver and without having to have all processes that were waiting on the page to wait for the complete Program and Erase cycle of a FLASH memory.

When the execution of a program encounters a page fault, there exists no mapping between process's virtual address page being accessed and a physical page in main memory. The kernel (core of the operating system) will find a free physical page in the main memory pool and bring in the requested data from the main storage which most frequently is in the form of a disk. This activity is called page-in. While page-in is in progress, all processes that refer to this particular page are wait-listed until the page-in activity is complete. When a process is no longer wait-listed for the page, it can proceed and perform a Read from that page. For a typical DRAM based DIMM, the DRAM device as soon as the DRAM engine completes the page write signals the kernel in order that the kernel can release the wait-listed processes. Unfortunately for the FLASH memory, the entire Program and Erase for a block (also referred to as a sector) is in tens of milliseconds. Without the Program and Erase being complete the incoming read will not be able to access the updated data.

Instead of having a device driver or kernel core wait for the period of the entire Program and Erase cycles, the page buffer 440 is introduced to temporarily hold at least one page of data so a typical DMA driver can perform the write and signal the kernel as if it were targeting a DRAM device. The kernel can then bring the waiting processes out for the wait-listed mode to match the performance of a typical DRAM based application. This page buffer 440 is preferably SRAM (static RAM) but can be DRAM device or other devices, embedded or not, that can provide fast write and read capability. The buffer 440 can also have address match logic which compares the incoming address to decide if the data return should be from the page buffer or from the actual FLASH device. The incoming address path goes straight to the underlying FLASH device to avoid losing precious latency. The address match logic can produce a match or mismatch result which in turns will drive a multiplexer for the data return.

FIGS. 5-7 illustrate example process methodologies for managing FLASH subsystems that employ DRAM memory to facilitate FLASH interface requirements. While, for purposes of simplicity of explanation, the processes or methodologies are shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Referring to FIG. 5, an example process 500 is illustrated that supports the system described in FIG. 2. At 510, a page fault is generated when memory is accessed from permanent storage device. The page fault triggers a determination at 520 to determine if the operation is a write or read sequence to the respective main program memory devices. If the operation is a read at 520, the process proceeds to allocate a flash page at 530 and marks or tags or flags the respective page as a copy-on-write page before proceeding with other program operations. If the operation detected at 520 is a write, a DRAM page is allocated at 540 and a FLASH page is de-mapped (e.g., vnode and offset pairs re-assigned) if the mapping already exists. As shown a 540, a copy-on-write for example can be employed to perform such DRAM allocation and FLASH de-mapping, as well as copying the content from FLASH to DRAM. The process 500 will now be shown in the context of a larger operating system management scheme in FIG. 6.

Referring to FIG. 6, a memory management process 600 is illustrated. At 614, a system boot is performed. A boot prom loads base kernel code at 616, creates kernel address spaces at 618, where the user then starts a program process at 620. The process at 620 generates a page fault at 624, where a read or write determination is then performed at 626. If a process read is detected at 626, the process proceeds to 628 to determine a fault type. If a minor fault is detected at 628, then attach read to the DRAM page at 630. If a major fault is detected at 628, then allocate flash and mark as copy-on-write at 632. As shown, free memory 634 is allocated between FLASH and DRAM at 636. If a protection fault is detected at 628, existing operating system page protecting schemes can be followed at 640.

Referring back to decision branch 626, the write decision branch is analyzed. If a write is detected from 624, the type of fault is again analyzed at 644. If a protection fault is determined at 644, the process proceeds to 640 and follows existing schemes. If a major fault is detected at 644, the process proceeds to 636 and allocates a DRAM page. If a minor fault is detected at 644, the process proceeds to 650. At 650, a determination is made as to whether or not an existing page is already in DRAM. If yes, a shared page determination is made at 654. If a page is shared at 654, an attachment is made at 656. If a shared page is not found at 654, the process proceeds to 636 and allocates a DRAM page. If an existing page is not in DRAM at 650, the process proceeds to 660 and allocates a DRAM page while de-mapping a FLASH page. A copy-on-write is then performed as previously described.

Referring briefly to FIG. 7, a dual memory list process 700 is illustrated that supports the system described in FIG. 3. In this aspect, a FLASH free memory area is maintained at 710 and a DRAM free memory area is created at 720. Each of the respective areas 710 and 720 include a cache list and free list portion for the respective FLASH and DRAM segments of memory. As shown, pages that are mapped to Virtual Address (VA) space and where a swap file system operation is performed at 730, a decision is made 740 whether or not to direct updates to the FLASH area of 710 or DRAM area 720. Similarly, if pages are mapped to a VA and a file at 750, data is then routed at 760 to the respective areas 710 and 720 depending on if it is designated for FLASH or DRAM. It is noted that a cache list can be structured as a hashed list by (vnode, offset). Thus, it is possible to combine the Flash cache list and the DRAM cache list. However, one would need to resolve the "tail" issue since when the free list is depleted, the tail of the cache list is served as "Free Memory."

Figure 8:
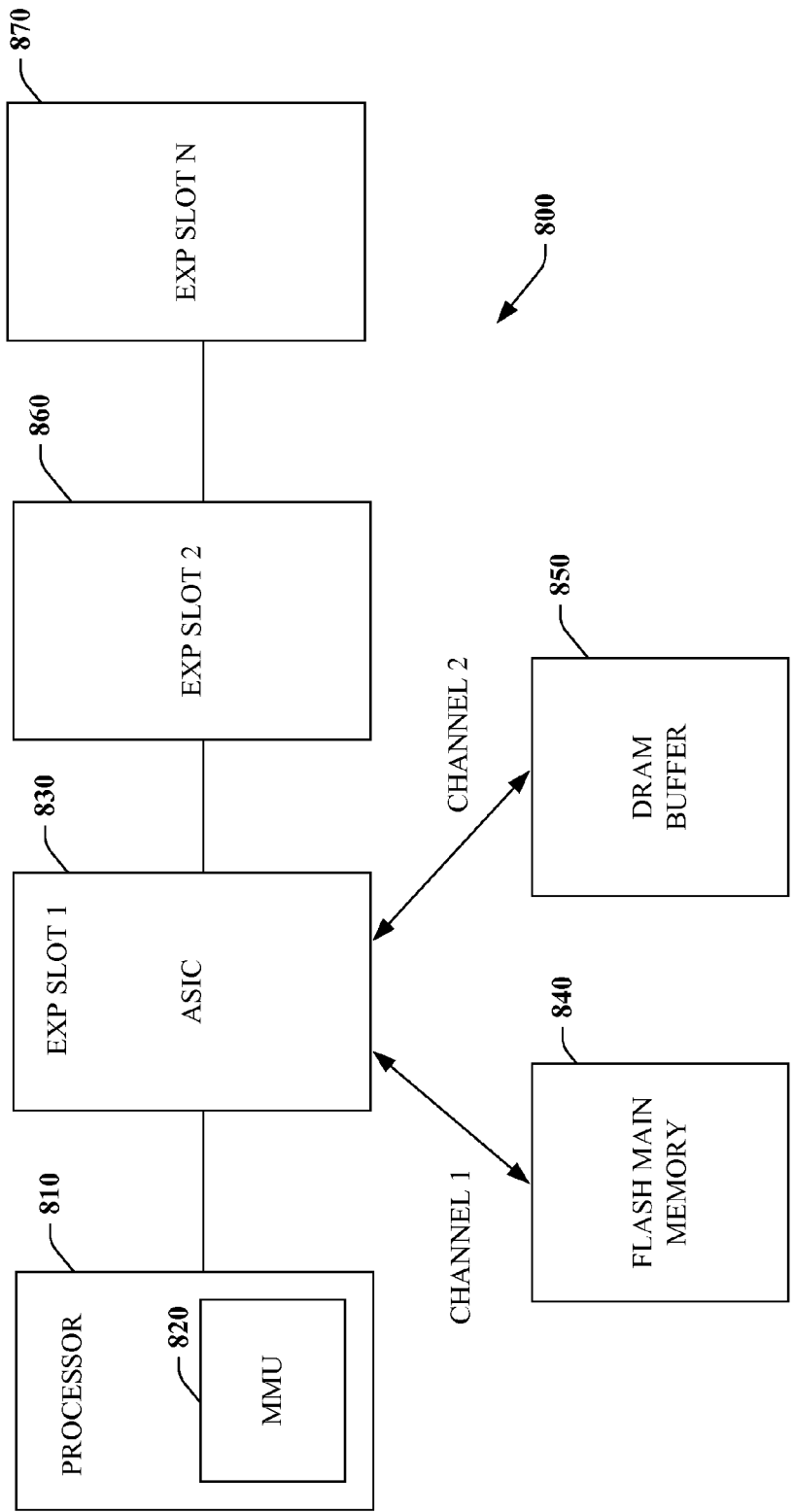
FIG. 8 illustrates a block diagram of a FLASH-DRAM hybrid memory architecture employed for random access memory applications.

Referring now to FIG. 8, a system 800 illustrates a FLASH memory architecture that is employed to support random access computer memory applications. Before proceeding, it is noted that the systems described below describe various hardware solutions for a dual memory architecture employing FLASH and DRAM. It is to be appreciated that processing for the dual memory nature can occur via hardware components, software components, and/or a combination of hardware and software.

The system 800 includes a processor 810 having a memory management unit (MMU) 820 that controls data flows into and out of the processor. An application specific integrated circuit (ASIC) 830 occupies an expansion slot and communicates to a FLASH component 840 and a DRAM buffer 850. As shown, one or more other slots 860 and 870 can be provided. In general, the processor 810 supports traditional DRAM data flows and timing, where in order to employ the FLASH component 840, the ASIC 830 provides controlled access to the FLASH component. Control includes read and write timing to the FLASH component 840 along with consideration of wear leveling to any particular sector of the FLASH. The DRAM buffer 850 allows temporary high speed access while background operations or other processes may be employed to transfer contents of the buffer to FLASH. The buffer can also be used for a temporary copy area to allow one area of FLASH to be re-mapped to another location of FLASH to mitigate wear in a given memory location.

In general, the processor 810 can communicate with each of the expansion slots 830, 860, and 870, where each slot can communicate with two or more channels. The ASIC 830 employs one channel (or more) to communicate with the FLASH component 840 and another channel (or more) to communicate with the DRAM buffer 850. As data from an application is written into the temporary DRAM buffer 850, it can be moved to the FLASH 840 during background operations or in accordance with other procedures described in more detail below. In an alternative aspect, an operating system (not shown) can be modified to recognize the FLASH component 840/DRAM Buffer 850 and thus employ the MMU 820 to update the FLASH from the DRAM buffer. The ASIC 830 basically controls or provides a controlled access in accordance with timing of the FLASH component 840. As can be appreciated, the expansion slots can be employed in various aspects. This include providing additional ASIC/memory expansion, providing additional FLASH capability of adding additional buffer memory. Memory can be configured as a dual inline memory module (DIMM) for the ASIC, FLASH, and/or DRAM buffer respectively. Thus, the expansion slots can be used to provide more ASIC capabilities, more FLASH capabilities, and/or more DRAM buffer capability. It is to be appreciated that dual in line memory module configurations are but one of many possible configurations and that substantially any type of packaging arrangement for FLASH and/or DRAM are possible.

The system 800 can include one or more memory components that can be comprised of a non-volatile memory (e.g., FLASH memory) and/or volatile memory (e.g., random access memory (RAM)). The memory components can receive information, including data, commands, and/or other information, which can be processed (e.g., store data, execute commands, etc.). The memory components can include a memory array that can receive and store data. The memory array can include a plurality of memory cells wherein each memory cell can store one or more bits of data. Data stored in a memory cell(s) in the memory array can be read and such data can be provided as an output, or can be erased from the memory cell(s) in accordance with the timing and wear considerations of the FLASH component 840.

Conventionally, when data is desired from a memory (e.g., FLASH memory), a host processor 830 can issue a command to the memory, where the memory command can include information regarding the particular memory device and a particular block, where the data can be stored on a page within the block. The memory can load a page from that block into a buffer (e.g., page buffer), where typically there can be multiple loads in order to load the page. In one aspect, the memory array can be comprised of a predetermined number of blocks, where a block can be the minimum portion of the memory component (e.g., FLASH memory) that can be erased and programmed during an erase operation.

Figure 9:
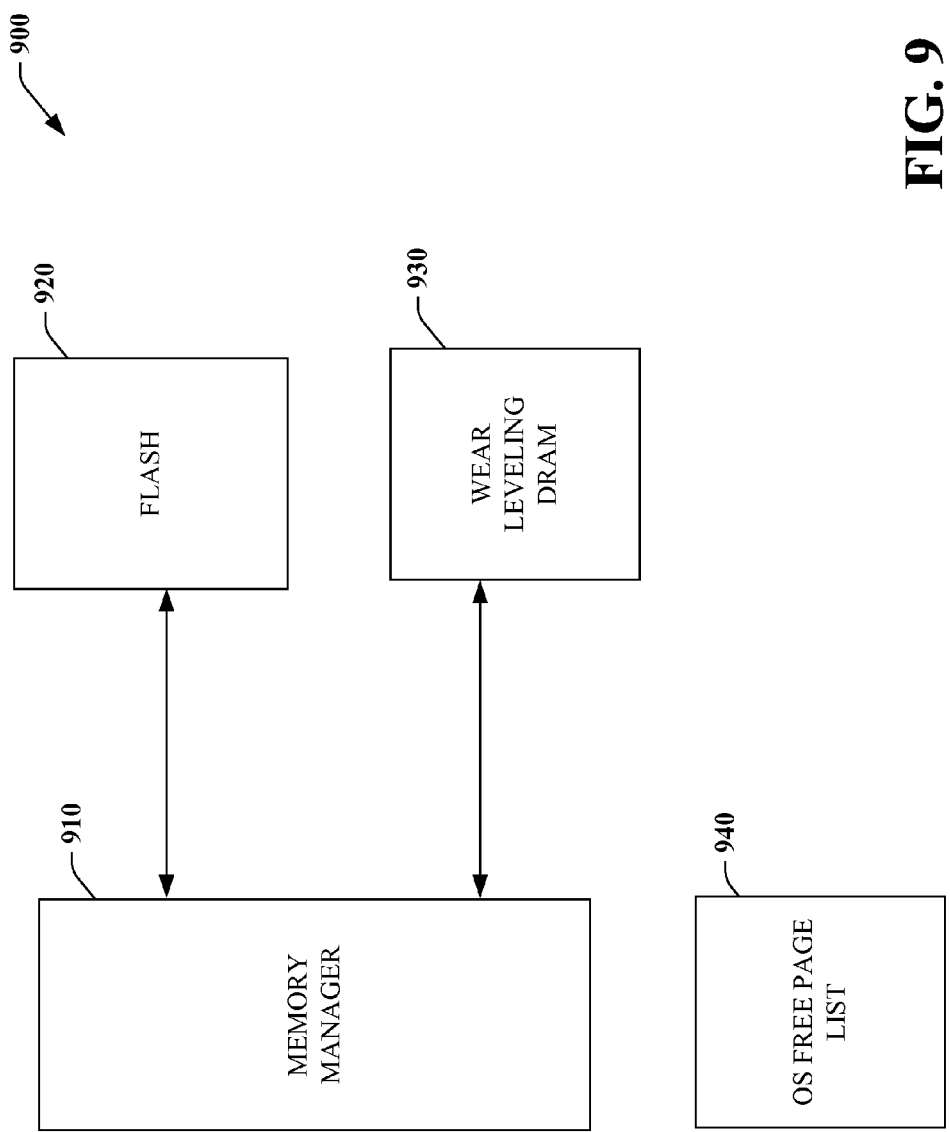
FIG. 9 depicts a block diagram of a wear leveling system for FLASH memory.

Turning to FIG. 9, a system 900 illustrates wear leveling concepts for FLASH memory devices. In this aspect, consideration is given to the concept that FLASH devices can wear out over time if the same memory addresses are always employed. Conventionally, FLASH memories were managed similar to a disk where a file system for memory management is used. The operating system communicates with the file system which informs about deleting or adding of files to the memory. The file system is aware of unmapped or free sectors within FLASH memory. When wear leveling is applied, a frequently written sector is de-mapped and replaced by an infrequently written sector from the free sector pool. For a completely full memory, this process can be entirely inefficient in that swapping of sectors can take up to two program writes and corresponding erase procedures.

The system 900 illustrates different operations to perform wear leveling in a FLASH based random access system. As shown, a memory manager 910 communicates with a FLASH memory 920. An additional DRAM buffer 930 is provided that is not visible to the main memory/operating system architecture. The DRAM buffer 930 is employed as a temporary storage area to allow re-mapping of lightly used FLASH addresses with more heavily used areas of FLASH. Thus, the DRAM buffer is only visible to the memory manager 910 and employed as a data exchange area for areas of FLASH memory that are heavily used. The spare capacity provided by the DRAM buffer 930 provides sector swap capabilities to facilitate wear leveling across the FLASH 920. In an alternative aspect, operating system software can be modified to provide a free list component 940. The operating system can inform an ASIC or other controller of areas of random access memory that are considered free and not currently in use by one or more applications. Such free list areas can be employed in lieu of the DRAM buffer 930 for wear leveling. As can be appreciated, a combination of DRAM buffer 930 and the free list component 940 could also be employed to perform wear leveling. It is noted that various counters can be maintained to track what sectors have been used and to determine when to perform wear leveling in the system e.g., threshold counter levels to determine when to swap highly used sectors with lightly used ones.

Figure 10:
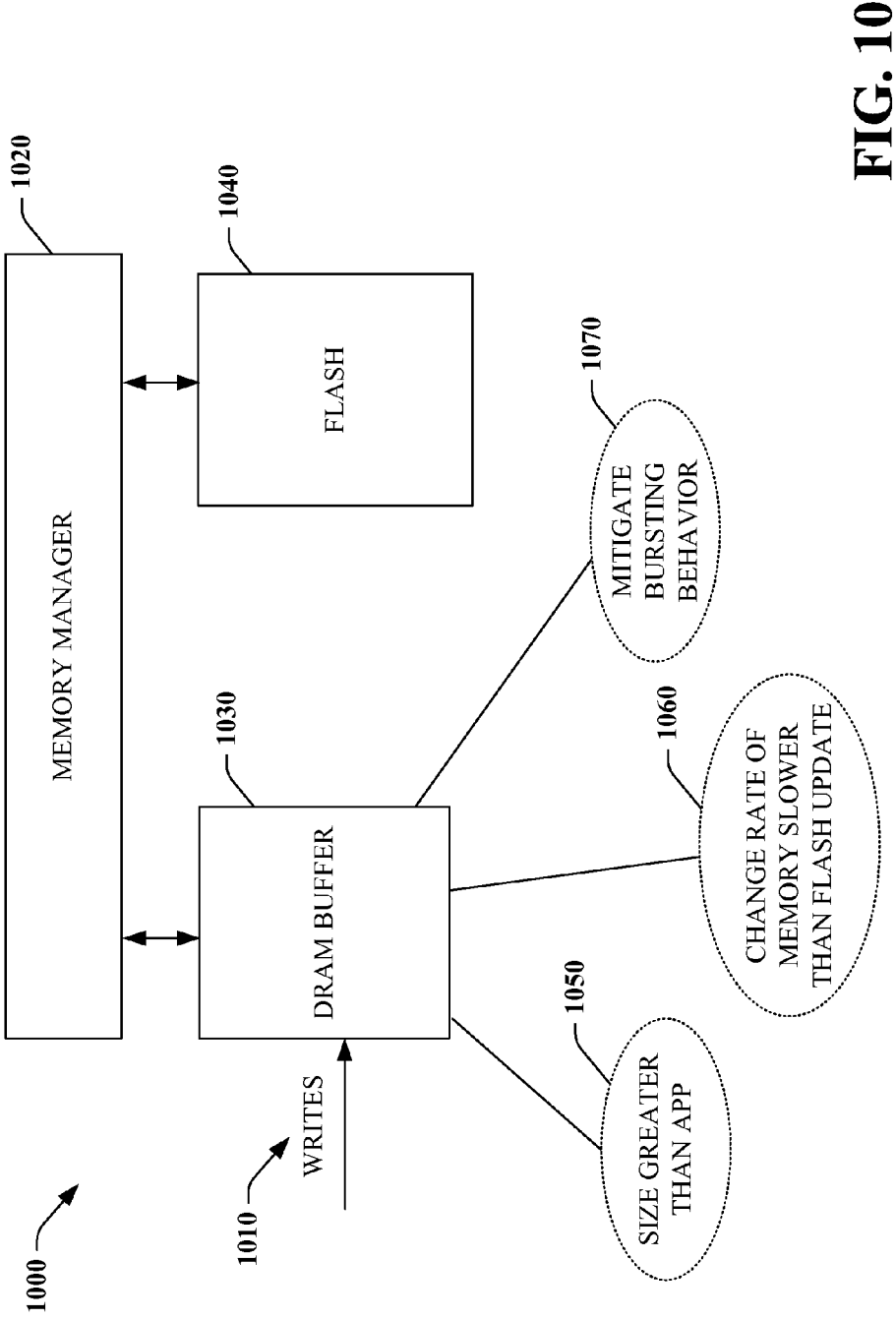
FIG. 10 is a block diagram depicting DRAM sizing and FLASH write considerations.

Referring now to FIG. 10, a system 1000 illustrates write timing access. As shown, write data 1010 is controlled by a memory manager 1020. The write data can be captured by a DRAM buffer 1030 and subsequently moved to a FLASH memory 1040 over time such as background operations of a process or thread. By moving the write data 1010 over time, the slower write times for the FLASH can be accommodated. In general, the DRAM buffer 1030 can be sized differently depending on application considerations. In one aspect, at 1050, the DRAM 1030 is sized such that it can temporarily hold data for any working set of a given application. In another aspect at 1060, if the change rate of the write working set to the DRAM buffer 1030 is slower than the update rates to the FLASH 1040, then even though the application can demand a much higher bandwidth than the FLASH can offer, such application can still execute efficiently on the system.

In yet another aspect, bursting behavior is considered at 1070. Here, data to be written may not change all that often but when data is written, it is written at a high rate over a short period of time. In this case, the DRAM 1030 can be employed to capture the high data rate and use background operations to spread that rate out over time. In other cases, operating system behavior can be modified to mitigate bursts such that data that is updated infrequently can be written over a longer period of time. Generally, data is written to the FLASH in chunks of sectors. Thus, typically at least one sector is cached in the DRAM before subsequently updating the FLASH.

Figure 11:
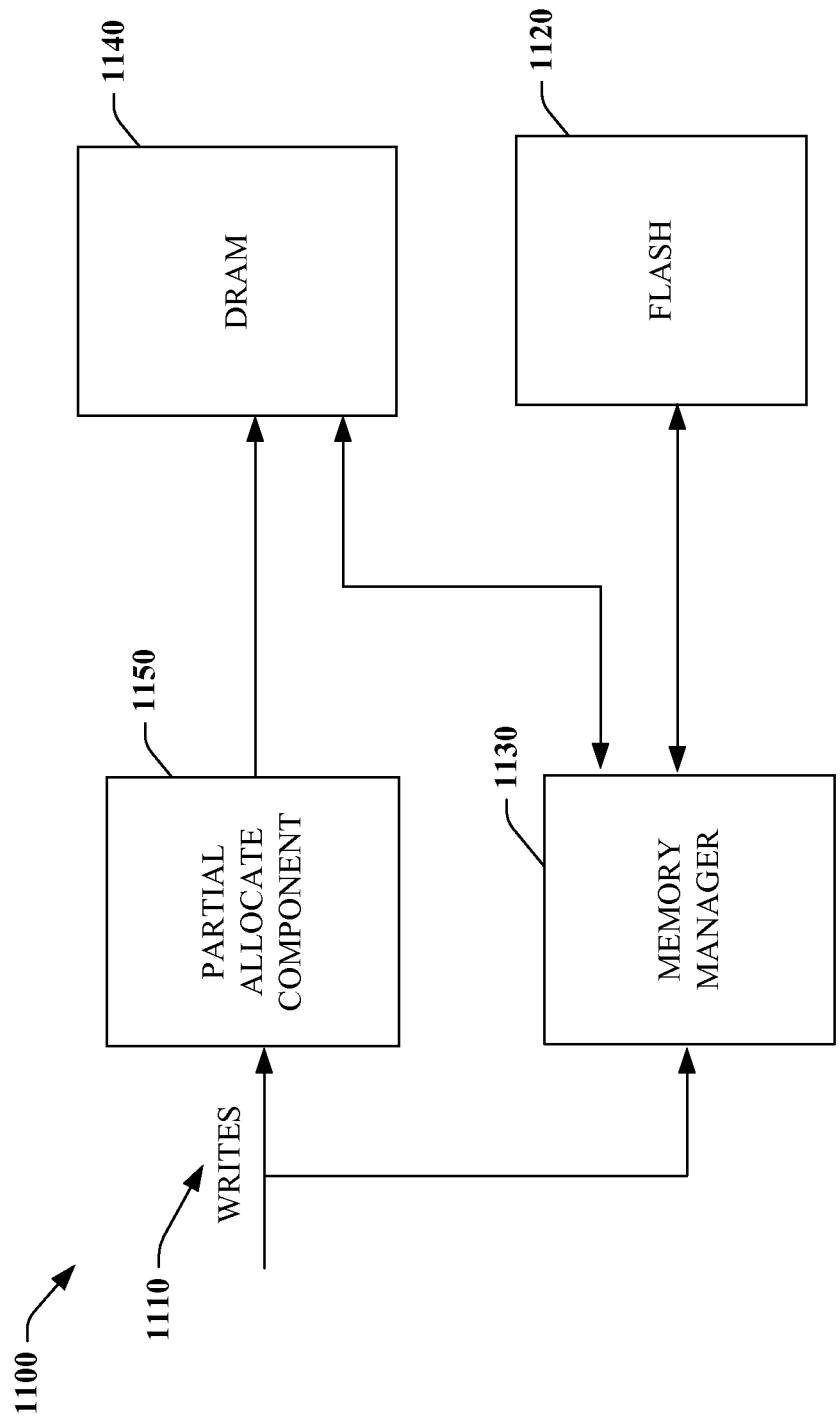
FIG. 11 illustrates a block diagram of a system that partially allocates contents from FLASH to mitigate system bus activity.

Referring now to FIG. 11, read and write bandwidth consideration issues are discussed for FLASH memory updates of system 1100. As discussed above, write data 1110 to a FLASH 1120 is typically controlled by an ASIC performing a memory manager function 1130 that controls timing to the FLASH. In order to mitigate system bandwidth from slowing down (e.g., copying from FLASH to buffer and vise versa), it is also desirable to mitigate how often contents of the FLASH 1120 are copied into a temporary DRAM storage area 1140. In conventional architectures, it is typical to copy all the contents for an application into working memory such as paging in from a disk. In this case, a partial allocation function 1150 is written where a small section of the FLASH 1120 is copied into the DRAM 1140 and updated with the corresponding write data 1110 from the application. If the application needs to read data, the small sector that has been updated can be read from the DRAM 1140 and the rest of the application data that was not copied can be read from FLASH.

Over time or after the page is no longer used, the updated write contents of the DRAM can be transferred into the FLASH 1120 as previously described above. The partial allocate function 1150 operates over incoming write requests that are written to DRAM pages. Other non-modified data is not brought into the DRAM from the FLASH 1120 thus conserving the number of read and write cycles on the system bus. The modified page can stay in DRAM 1140 as long as needed.

Figure 12:
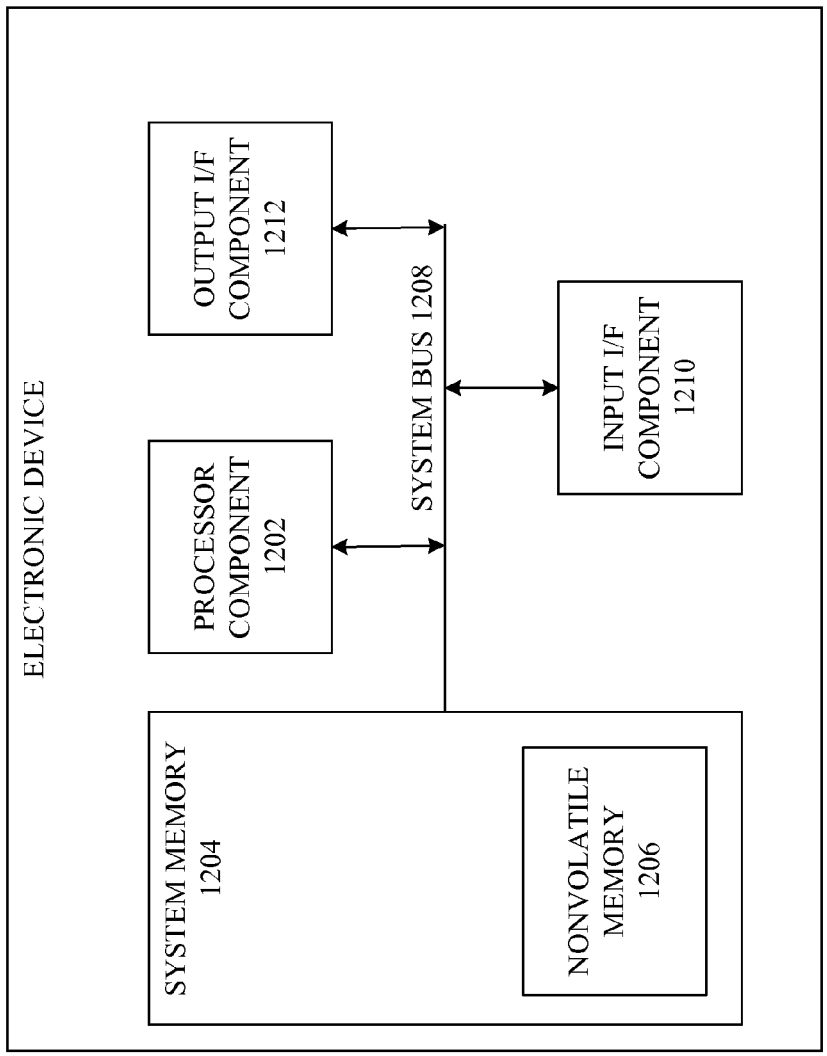
FIG. 12 illustrates an example of an electronic device that can be associated with a memory.

Referring to FIG. 12, a block diagram illustrates an exemplary, non-limiting electronic device 1200 that can comprise and/or incorporate the systems or components previously described. The electronic device 1200 can include, but is not limited to, a computer, a laptop computer, network equipment (e.g., routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), set-top boxes, a digital video recorder, a gaming console, a navigation system or device (e.g., global position satellite (GPS) system), a secure memory device with computational capabilities, a device with a tamper-resistant chip(s), an electronic device associated with an industrial control system, an embedded computer in a machine (e.g., an airplane, a copier, a motor vehicle, a microwave oven), and the like.

Components of the electronic device 1200 can include, but are not limited to, a processor component 1202 (e.g., which can be and/or can include the same or similar functionality as processor component 302, as depicted in FIG. 3 and described herein), a system memory 1204, which can contain a nonvolatile memory 1206, and a system bus 1208 that can couple various system components including the system memory 1204 to the processor component 1202. The system bus 1208 can be any of several types of bus structures including a memory bus or memory controller, a peripheral bus, or a local bus using any of a variety of bus architectures.

Electronic device 1200 can typically include a variety of computer readable media. Computer readable media can be any available media that can be accessed by the electronic device 1200. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 1206 (e.g., FLASH memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1200. Communication media typically embodies computer readable instructions, data structures, program modules or other data in a modulated data signal such as a carrier wave or other transport mechanism and includes any information delivery media.

The system memory 1204 can include computer storage media in the form of volatile (e.g., SRAM) and/or nonvolatile memory 1206 (e.g., FLASH memory). For example, nonvolatile memory 1206 can be the same or similar, or can contain the same or similar functionality, as memory component 1202. A basic input/output system (BIOS), containing the basic routines that can facilitate transferring information between elements within electronic device 1200, such as during start-up, can be stored in the system memory 1204. The system memory 1204 typically also can contain data and/or program modules that can be accessible to and/or presently be operated on by the processor component 1202. By way of example, and not limitation, the system memory 1204 can also include an operating system(s), application programs, other program modules, and program data.

The nonvolatile memory 1206 can be removable or non-removable. For example, the nonvolatile memory 1206 can be in the form of a removable memory card or a USB FLASH drive. In accordance with one aspect, the nonvolatile memory 1206 can include FLASH memory (e.g., single-bit FLASH memory, multi-bit FLASH memory), ROM, PROM, EPROM, EEPROM, or NVRAM (e.g., FeRAM), or a combination thereof, for example. Further, a FLASH memory can comprise NOR FLASH memory and/or NAND FLASH memory. In accordance with another aspect, the nonvolatile memory 1206 can comprise one or more memory components.

A user can enter commands and information into the electronic device 1200 through input devices (not shown) such as a keypad, microphone, tablet, or touch screen although other input devices can also be utilized. These and other input devices can be connected to the processor component 1202 through input interface component 1210 that can be connected to the system bus 1208. Other interface and bus structures, such as a parallel port, game port or a universal serial bus (USB) can also be utilized. A graphics subsystem (not shown) can also be connected to the system bus 1208. A display device (not shown) can be also connected to the system bus 1208 via an interface, such as output interface component 1212, which can in turn communicate with video memory. In addition to a display, the electronic device 1200 can also include other peripheral output devices such as speakers (not shown), which can be connected through output interface component 1212.

It is to be understood and appreciated that the computer-implemented programs and software can be implemented within a standard computer architecture. While some aspects of the disclosure have been described above in the general context of computer-executable instructions that can be run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

It is also to be understood and appreciated that cryptographic protocols can be employed to facilitate security of data associated with a memory (e.g., memory component 102) in accordance with the disclosed subject matter. For example, a cryptographic component (e.g., cryptographic engine) can be employed and can facilitate encrypting and/or decrypting data to facilitate securing data being written to, stored in, and/or read from the memory. The cryptographic component can provide symmetric cryptographic tools and accelerators (e.g., Twofish, Blowfish, AES, TDES, IDEA, CAST5, RC4, etc.) to facilitate data security. The cryptographic component can also provide asymmetric cryptographic accelerators and tools (e.g., RSA, Digital Signature Standard (DSS), and the like) to facilitate securing data. Additionally, the cryptographic component can provide accelerators and tools (e.g., Secure Hash Algorithm (SHA) and its variants such as, for example, SHA-0, SHA-1, SHA-224, SHA-256, SHA-384, and SHA-512) to facilitate data security.

It is to be appreciated and understood that authentication protocols can be employed to facilitate security of data associated with the memory (e.g., memory component 102) in accordance with the disclosed subject matter. For example, an authentication component can solicit authentication data from an entity, and, upon the authentication data so solicited, can be employed, individually and/or in conjunction with information acquired and ascertained as a result of biometric modalities employed, to facilitate control access to the memory. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by the authentication component. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

As utilized herein, terms "component," "system," "interface," and the like, are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and FLASH memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
   a random access memory subsystem comprising:
   one or more flash memory devices configured to store a first portion of data;
   a volatile memory device configured to store at least a second portion of data, wherein the volatile memory device and the one or more memory devices configured to operate as a main memory of the random access memory subsystem;
   a virtual management component that is configured to manage the one or more flash memory devices and the volatile memory device for random access memory applications, wherein the virtual management component is configured to utilize the one or more flash memory devices in conjunction with a volatile buffer memory component for at least one random memory access application;
   the volatile buffer memory component configured to operate in conjunction with the virtual management component and to temporarily store at least one page of data of the first portion of data being copied to flash memory of the one or more flash memory devices from a main non-volatile storage during a page-in activity associated with the at least one random access application, wherein, when the at least one random access application comprises a read operation to read the at least one page of data, the volatile buffer memory component is further configured to comprise address match logic that compares an incoming memory address relating to the at least one page of data to determine whether the at least one page of data is to be provided by the volatile buffer memory component or by the flash memory to mitigate latencies associated with the one or more flash memory devices; and
   a second volatile buffer memory component configured to receive a subset of data from a first sector of the flash memory, temporarily store the subset of data in the second volatile buffer memory component, and provide communicate the subset of data from the second volatile buffer memory component to a second sector of the flash memory for storage in the second sector, to facilitate wear leveling of the flash memory, wherein the first sector is identified as a more highly used sector of the flash memory than the second sector, and wherein the virtual memory management component de-maps a first physical address of the first sector from a virtual address and maps a second physical address of the second sector to the virtual address.

2. The system of claim 1, further comprising a first free list component and a first cache list component that are associated with the one or more flash memory devices, and a second free list component and a second cache list component that are associated with the volatile buffer memory component.

3. The system of claim 1, further comprising a kernel configured to wait-list the at least one page of data during the page-in activity to prevent the read of the at least one page of data until the kernel receives a signal that indicates the at least one page of data is loaded in at least one of the volatile buffer memory component or the flash memory, wherein the volatile buffer memory component is configured to be connected to the flash memory, wherein the volatile buffer memory component is further configured to load and temporarily store the at least one page of data at a quicker rate than performance of a program and erase cycle to load the at least one page of data into the flash memory, and wherein the kernel is further configured to end the wait-list of the at least one page of data to allow the read of the at least one page of data from the volatile buffer memory component, even if the at least one page of data is not available to be read from the flash memory, to mitigate latencies associated with the flash memory.

4. The system of claim 1, wherein, during a read operation associated with the at least one random access memory application, the virtual management component is further configured to utilize the one or more flash memory devices to execute the read operation.

5. The system of claim 4, wherein, during a write operation associated with the at least one random access memory application, the virtual management component is further configured to initially utilize the volatile buffer memory component to execute the write operation to write the first portion of data to the one or more flash memory devices by transfer of the first portion of data to the volatile buffer memory component to temporarily store the first portion of data and subsequent transfer of the first portion of data from the volatile buffer memory component to the one or more flash memory devices in a background operation of an associated operating system, wherein, while the first portion of data is temporarily stored in the volatile buffer memory component, the first portion of data is available for a subsequent operation during the at least one random access memory application.

6. The system of claim 1, further comprising a free page component configured to detect when memory pages have been freed.

7. The system of claim 6, the free page component is further configured to detect when pages have been mapped to a virtual address and to a swap file system.

8. The system of claim 6, the free page component is further configured to detect when pages have been mapped to a virtual address and to a file.

9. The system of claim 6, the pages are allocated based at least in part on whether or not hits are detected to an existing mapped page.

10. The system of claim 6, the pages are allocated based at least in part on page faults that include major faults, minor faults, or protection faults.

11. The system of claim 6, further comprising a read page fault that triggers a page-in operation permanent storage.

12. The system of claim 11, further comprising a page scanner that is configured to free one or more pages to one or more lists.

13. The system of claim 12, the page scanner is configured to be triggered from a determined shortage of flash memory or a determined shortage of volatile buffer memory.

14. The system of claim 13, the volatile buffer memory component is adapted to a dynamic data ram (DDR) memory channel.

15. The system of claim 13, further comprising a minor page fault that is configured to trigger a mapping to an existing physical page.

16. The system of claim 15, further comprising a configuration option configured to allocate a dynamic random access memory (DRAM) page directly upon a read page fault.

17. The system of claim 16, the configuration option is further configured to allow moving pages during background operations.

18. A method to operate a memory subsystem, comprising:
employing at least one processor to execute computer executable instructions stored in memory to perform acts comprising:
managing one or more non-volatile memory components to utilize the one or more non-volatile memory components in conjunction with a volatile buffer memory component for at least one random memory access application;
managing a volatile memory component to utilize the volatile memory component in conjunction with the one or more non-volatile memory components to operate together as a main memory;
utilizing the volatile buffer memory component to temporarily store at least one page of data being copied to non-volatile memory of the one or more non-volatile memory components from a main non-volatile storage during a page-in activity associated with the at least one random access application;
comparing an incoming memory address relating to the at least one page of data to determine whether the at least one page of data is to be provided by the volatile buffer memory component or by the non-volatile memory when the at least one random access memory application comprises a read operation to read the at least one page of data; and
to facilitate wear leveling of non-volatile memory of the one or more non-volatile memory components,
temporarily storing a subset of data received from a first sector of the non-volatile memory in a second volatile buffer memory component,
communicating the subset of data from the second volatile buffer memory component to a second sector of the non-volatile memory, wherein the first sector is identified as a more highly used sector of the non-volatile memory than the second sector, and
modifying a mapping of physical addresses and virtual addresses associated with the non-volatile memory to de-map a first physical address of the first sector from a virtual address and map a second physical address of the second sector to the virtual address.

19. The method of claim 17, further comprising moving data to the one or more non-volatile memory components during background memory operations.

20. A system, comprising:
means for storing a first portion of data in a flash memory of one or more flash memory components;

means for storing a second portion of data in a volatile memory, wherein the flash memory and the volatile memory are utilized together as a main memory;

means for controlling the one or more flash memory components to utilize the one or more flash memory components in conjunction with a volatile buffer memory component for at least one random access memory application;

means for utilizing the volatile buffer memory component to temporarily store at least one page of data of the first portion of data being copied to the flash memory from a main non-volatile storage during a page-in activity associated with the at least one random access memory application, wherein, when the at least one random access application comprises a read operation to read the at least one page of data, the means for utilizing the volatile buffer memory component utilizes address match logic that compares an incoming memory address relating to the at least one page of data to determine whether the at least one page of data is to be provided by the volatile buffer memory component or by the flash memory to mitigate latencies associated with the one or more flash memory components;

means for temporarily storing a subset of data received from a first sector of the flash memory in a second volatile buffer memory component to facilitate wear leveling of the flash memory;

means for communicating the subset of data from the second volatile buffer memory component to a second sector of the flash memory to facilitate the wear leveling of the flash memory, wherein the first sector is identified as a more highly used sector of the flash memory than the second sector; and means for controlling a mapping of physical addresses and virtual addresses associated with the flash memory to de-map a first physical address of the first sector from a virtual address and map a second physical address of the second sector to the virtual address, to facilitate the wear leveling of the flash memory.

* * * * *